(12) United States Patent
Clark et al.

(10) Patent No.: US 9,007,586 B2
(45) Date of Patent: Apr. 14, 2015

(54) COLLECTION OPTICS FOR A COLOR SENSOR

(75) Inventors: Stephan Clark, Albany, OR (US); Brett E. Dahlgren, Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 667 days.

(21) Appl. No.: 13/265,222

(22) PCT Filed: Apr. 20, 2009

(86) PCT No.: PCT/US2009/036647
§ 371 (c)(1),
(2), (4) Date: Oct. 19, 2011

(87) PCT Pub. No.: WO2010/123484
PCT Pub. Date: Oct. 28, 2010

(65) Prior Publication Data
US 2012/0038923 A1   Feb. 16, 2012

(51) Int. Cl.
| | | |
|---|---|---|
| *G01J 3/40* | (2006.01) | |
| *G01J 3/50* | (2006.01) | |
| *G02B 13/22* | (2006.01) | |
| *G01J 3/02* | (2006.01) | |

(52) U.S. Cl.
CPC . *G01J 3/50* (2013.01); *G02B 13/22* (2013.01); *G01J 3/02* (2013.01); *G01J 3/0208* (2013.01); *G01J 3/0229* (2013.01)

(58) Field of Classification Search
CPC ......... G01J 3/2823; G01J 3/02; G01J 3/0208; G01J 3/0229; G02B 13/22

USPC .................................. 356/402; 359/663, 740
See application file for complete search history.

(56) References Cited

U.S. PATENT DOCUMENTS

| | | | |
|---|---|---|---|
| 4,062,623 A * | 12/1977 | Suzuki et al. | 359/209.1 |
| 5,300,766 A | 4/1994 | Granger et al. | |
| 5,642,191 A * | 6/1997 | Mende | 356/326 |
| 6,002,476 A * | 12/1999 | Treado | 356/301 |
| 6,198,577 B1 * | 3/2001 | Kedar et al. | 359/663 |
| 6,322,192 B1 * | 11/2001 | Walker | 347/19 |
| 6,517,180 B2 | 2/2003 | Tullis et al. | |
| 6,560,012 B2 * | 5/2003 | Adachi et al. | 359/368 |
| 6,628,390 B1 * | 9/2003 | Johnson | 356/400 |
| 6,856,466 B2 | 2/2005 | Tocci | |
| 6,975,949 B2 | 12/2005 | Mestha et al. | |
| 7,236,239 B2 | 6/2007 | Hase | |
| 7,242,478 B1 * | 7/2007 | Dombrowski et al. | 356/419 |
| 7,333,208 B2 | 2/2008 | Mestha et al. | |

(Continued)

FOREIGN PATENT DOCUMENTS

| | | |
|---|---|---|
| EP | 1744149 A1 | 1/2007 |
| JP | 2004155140 A | 6/2004 |

(Continued)

*Primary Examiner* — Kara E Geisel
(74) *Attorney, Agent, or Firm* — Hewlett-Packard Patent Department (57) ABSTRACT

An optical system includes a lens, a pupil relay, and an aperture stop positioned at a focal point of the lens between the lens and the pupil relay. The lens is configured to collect a plurality of light bundles. Each light bundle emanates from a field point of an object plane and has a center ray substantially parallel to an optical axis of the lens. The lens is configured to direct the center ray of each light bundle through the aperture stop and onto the pupil relay. The pupil relay is configured to image a plane of the aperture stop onto a sensor array.

12 Claims, 7 Drawing Sheets

(56) References Cited

U.S. PATENT DOCUMENTS

| | | |
|---|---|---|
| 2002/0159162 A1* | 10/2002 | Ramm et al. .................. 359/663 |
| 2003/0007254 A1* | 1/2003 | Tocci .......................... 359/663 |
| 2003/0214648 A1 | 11/2003 | Rucker et al. |
| 2003/0223248 A1* | 12/2003 | Cronin et al. ................. 362/555 |
| 2005/0240366 A1 | 10/2005 | Mestha et al. |
| 2006/0077385 A1* | 4/2006 | Wang et al. .................. 356/328 |
| 2007/0252976 A1 | 11/2007 | Heine et al. |

FOREIGN PATENT DOCUMENTS

| | | |
|---|---|---|
| JP | 2005271369 A | 10/2005 |
| KR | 20050048909 A | 5/2005 |

* cited by examiner

Lens Data Editor
EDIT  SOLVES  OPTIONS  HELP

54

| SURF:TYPE | | RADIUS | | THICKNESS | | GLASS | SEMI-DIAMETER | | CONIC |
|---|---|---|---|---|---|---|---|---|---|
| OBJ | Standard | Infinity | | 13.000000 | | | 3.535534 | | 0.000000 |
| 1* | Even Asphere | 8.881928 | | 5.000000 | | 480R | 5.150000 | U | 0.000000 |
| 2* | Even Asphere | -5.898420 | | 5.532613 | | | 5.150000 | P | 0.000000 |
| STOP | Standard | Infinity | | 8.500068 | V | | 1.400000 | U | 0.000000 |
| 4 | Standard | Infinity | | 0.593451 | V | | 3.700636 | | 0.000000 |
| 5* | Even Asphere | 17.450826 | V | 6.000000 | | 480R | 5.400000 | U | 0.000000 |
| 6* | Even Asphere | -8.037469 | V | 15.504428 | V | | 5.400000 | U | 0.000000 |
| 7 | Standard | Infinity | | 1.000000 | | BK7 | 2.800068 | | 0.000000 |
| 8 | Standard | Infinity | | 0.500000 | | | 2.857664 | | 0.000000 |

56

| SURF:TYPE | | $2^{nd}$ Order Term | | $4^{th}$ Order Term | | $6^{th}$ Order Term | | $8^{th}$ Order Term | | $10^{th}$ Order Term |
|---|---|---|---|---|---|---|---|---|---|---|
| OBJ | Standard | | | | | | | | | |
| 1* | Even Asphere | 0.000000 | | 4.217717E-004 | | -9.958233E-005 | | 2.065733E-006 | | 0.000000 |
| 2* | Even Asphere | 0.000000 | | 2.569069E-003 | | -1.032811E-004 | | 2.580104E-006 | | 0.000000 |
| STOP | Standard | | | | | | | | | |
| 4 | Standard | | | | | | | | | |
| 5* | Even Asphere | 0.000000 | | 9.019284E-004 | V | -1.126344E-004 | V | 2.941308E-006 | V | 0.000000 |
| 6* | Even Asphere | 0.000000 | | -4.088928E-003 | V | 1.809047E-004 | V | -2.593391E-006 | V | 0.000000 |
| 7 | Standard | | | | | | | | | |
| 8 | Standard | | | | | | | | | |

COLLECTION OPTICS FOR A COLOR SENSOR

BACKGROUND

Color sensors are utilized in printing systems to detect color reproduction accuracy. In operation, light reflected from a sample formed on a print medium is captured by a sensor array. The output from the array is analyzed to identify the color of the sample. System parameters may be adjusted when the identified color differs from that which is expected. While samples of identical color may be formed on two different print media, certain events can cause color sensors to identify the two samples as being of different colors causing the printing system to make unnecessary and perhaps undesirable corrections. For example, the samples may be formed on print media of different thicknesses such that the second sample is positioned closer to the sensor array. The differing positions, absent correction, may cause the two samples to be identified being of different colors. In another example, the samples may be formed on two different types of print media having differing scattering profiles. For example, one sample may be formed on glossy paper while the second is formed on paper having a matte finish. The differing scattering profiles, absent correction, may cause the two samples to be identified being of different colors.

DESCRIPTION

While samples of identical color may be formed on two different print media, certain events can cause a color sensor to identify the two samples as being of different colors causing a printing system to make unnecessary and perhaps undesirable corrections. Examples of such events include forming the two samples on print media of differing types and deviating positions of the first and second samples with respect to the color sensor. Various embodiments described below were developed in an effort to reduce or eliminate the effects such events have on color sensing.

Figure 1:
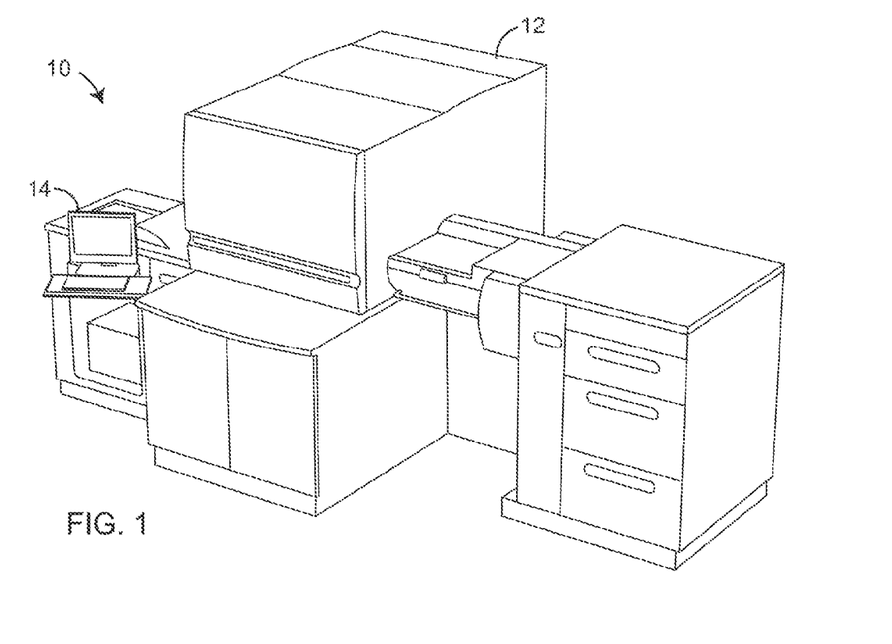
FIGS. 1 and 2 are exemplary diagrams of environment in which various embodiments may be implemented.
Figure 2:
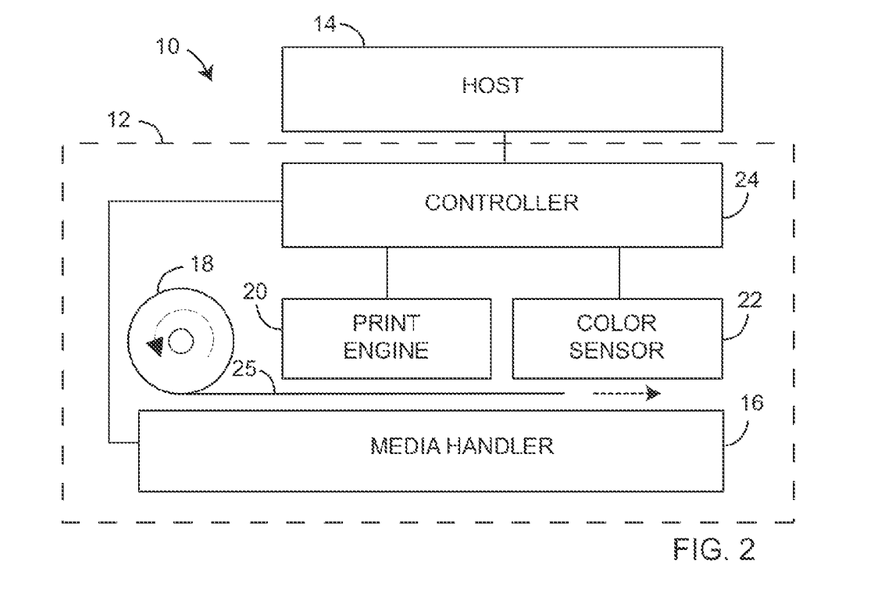

Environment:

FIGS. 1-2 depict an exemplary environment 10 in which various embodiments may be implemented. Starting with FIG. 1, environment 10 is shown to include printing system 12 and host 14. Printing system 12 represents generally an assembly of components configured to produce printed images of print media. Printing system 12, for example, may be used for printing photographs, forms, advertisements, lottery tickets, and the like. Host 14 represents generally any computing device capable communicating print jobs to print system 12. Host 14 may also supply a user interface allowing a user to obtain status information and to configure printing system 12. While shown as a larger scale printer, printing system 12 may instead be a smaller scale personal printer.

FIG. 2 is an exemplary block diagram of environment 10. In this example, printing system 12 is shown to include media handler component 16, media source 18, print engine 20, color sensor 22, and controller 24. Media handler 16 represents generally any component capable of transporting print media through print system 12. Print media may include paper sheets, a continuous web, or any other media on which a print image can be formed. Media source 18 represents generally any component configured to supply a print medium 25. In this example print medium 25 is depicted as a continuous web. In other implementations, print medium 25 can take any one of any number of possible forms. Print engine 20 represents generally any component capable of being utilized to form desired images on print medium 25. In a given example, print engine 20 may include a print head configured to dispense ink. In another example, print engine 20 may be configured to fuse toner to print media 25. Color sensor 22, described in more detail below, represents generally a component configured to be utilized to identify a color of a sample formed on print medium 25. The sample, for example, may be an image or portion thereof formed by print engine 20 on print medium 25.

Controller 24 represents generally any combination of hardware and programming capable of guiding and coordinating the operation of media handler 16, print engine 20, and color sensor 22. In particular, controller 24 is responsible for communicating commands to print component 20 and color sensor 22. Commands communicated by controller 24 can include both directives to perform a particular tasks as well as status queries. A status query may direct print engine 20 to report errors or warnings as well and other status information related to consumable usage and levels for items such as ink or toner. A given directive may cause print engine 20 to form desired images on print medium 25. Another directive may cause color sensor 22 to produce an output indicative of a color of a sample formed on print medium 25. Controller 24 is responsible for analyzing that output to identify the color.

Figure 3:
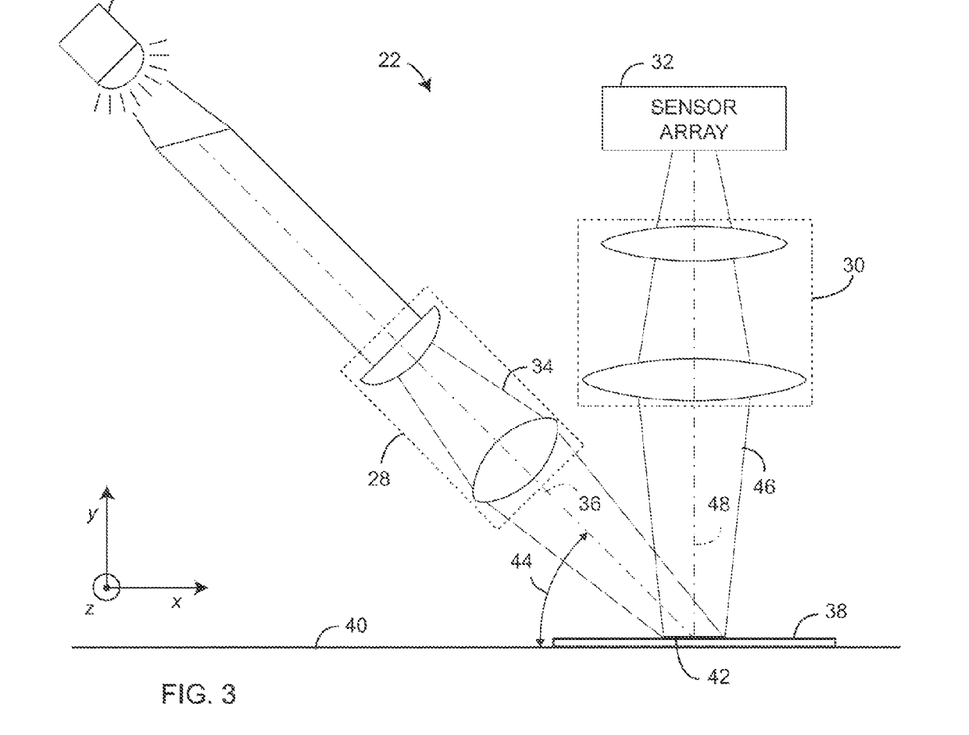
FIG. 3 is a schematic side view of an exemplary color sensor according to an embodiment.

Color Sensor:

FIG. 3 is an exemplary schematic side view of an exemplary color sensor 22 according to an embodiment. Color sensor 22 is shown to include illumination source 26, projection optics 28, collection optics 30, and sensor array 32. Illumination source 26 represents generally any component capable of producing a light beam 34. First optics 28 represents generally any combination of optical elements configured to project light beam 34 along projection axis 36 onto sample 38. Projection axis 36 represents the axis along which light beam 34 is projected between first optics 28 and sample 38. Sample 38 represents generally a printed image or portion thereof formed on print medium 40.

Projected light beam 34 forms a spot 42 on sample 38. Light is reflected from sample 38. Collection optics 30 represents any combination of optical elements configured to collect, along collection axis 48, light 46 reflected from sample 38 directing the collected light 46 onto sensor array 32. Collection axis 48 represents the axis along which light reflected from sample 38 is directed to sensor array 32, in the example of FIG. 3, the x,y axes define the surface of the page. The z axis extends into and out of the page. Projection axis 36 and collection axis 48 define an illumination plane.

Sensor array 32 represents a plurality of sensors each configured to generate an output indicative of whether or not a given sample is of a particular color. The combined output of the sensors can then be analyzed to identify the actual color of sample 38. In a given example, each of the sensors may be a photodiode filtered to accept light of a given wavelength range. For example, one sensor may be filtered to detect primarily the color red, another sensor may be filtered to detect primarily green, and so on.

Figure 4:
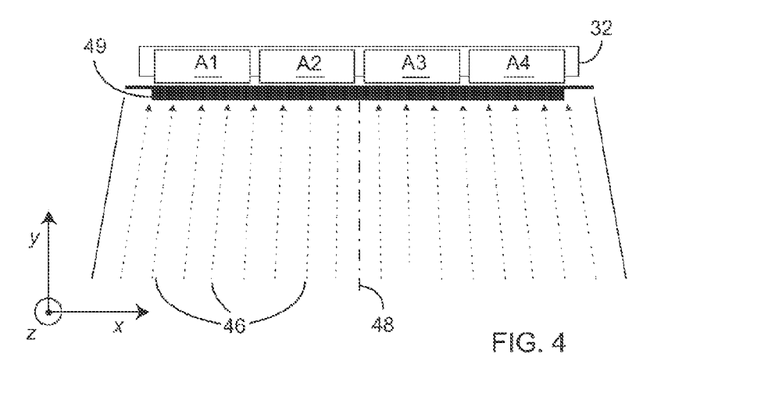
FIG. 4 is an exemplary schematic view of a sensor array.

Referring to FIG. 4, sensor array 32 is shown from a side view in which light 46 is directed along reflection axis 48 onto sensors A1-A4. In FIG. 4, the x,y axes define the surface of the page while the z axis extends into and out of the page. In this example light 46 is distributed evenly with a symmetric distribution across sensors A1-A4. The distribution is indicated by spot 49 of light 46 directed onto sensor array 32. A number of factors can affect how light reflects or otherwise emanates from a sample 38 under test. Differing print media types such as glossy and matte have differing scattering profiles meaning that light reflects differently from each. Further, sample 38 may, for a number of reasons, be positioned closer to collection optics 30 than expected.

Figure 5:
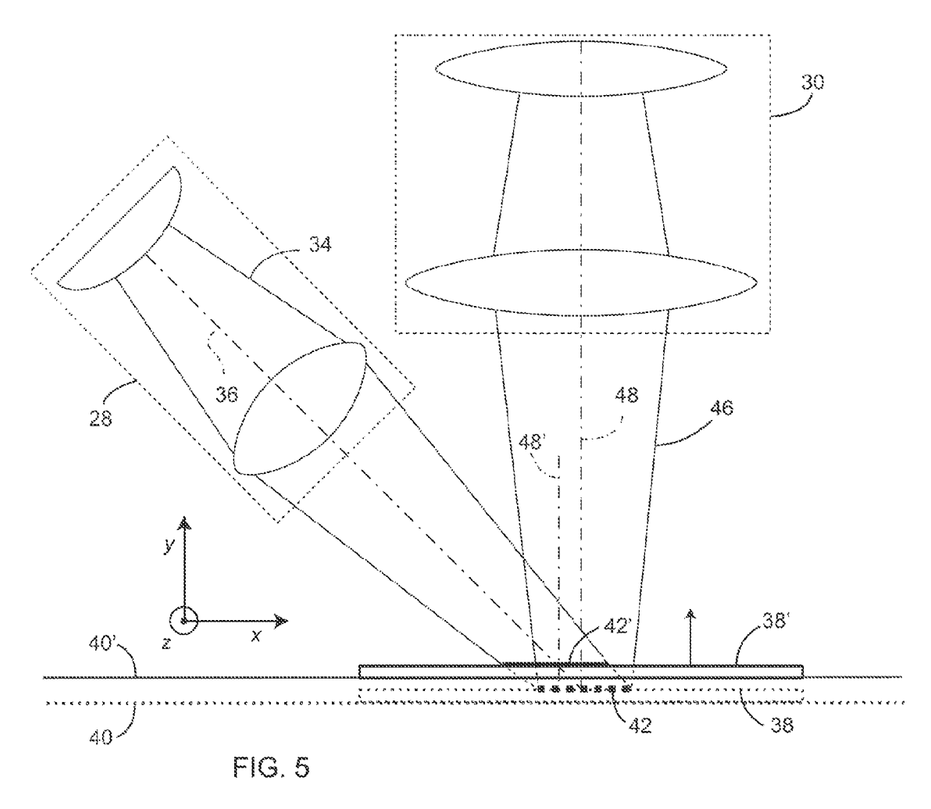
FIG. 5 is an exemplary schematic side view of the sensor array of FIG. 4.

FIG. 5 depicts a shift in expected position of a sample 38 with respect to position of collection optics 30. Here, the expected position of sample 38 is indicated in dashed lines, while the actual position of sample 38' is shown in solid lines. As depicted, sample 38' is positioned closer to collection optics 30 than expected. Thus, spot 42' of light beam 34 directed onto sample 38' is positioned closer to collection optics 30 than expected as well as shifted laterally in the field of view of the collection optics 30. The change in expected position may, for example be caused by use of a thicker print medium 40' or by a buckle formed in print medium 40'. The change in expected position of sample 38 causes collection optics 30 to direct reflected light 46 in an unexpected manner resulting in a different distribution of light across color sensor 32 than it would if the media were in a nominal position such as that shown in FIG. 3.

Figure 6:
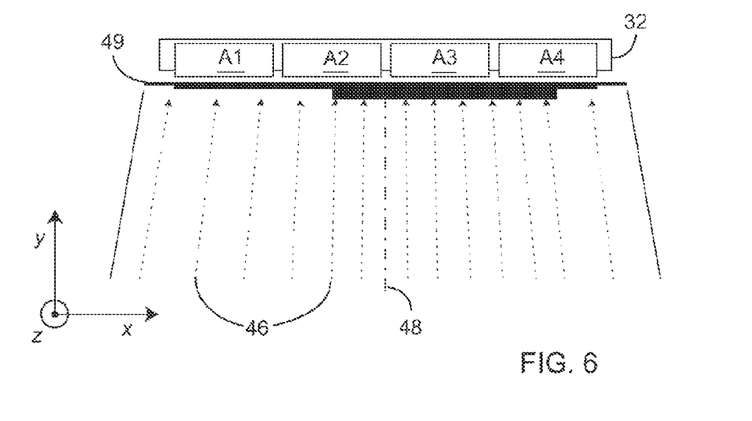
FIG. 6 is a partial schematic side view of a color sensor showing a displacement of a print medium.

FIG. 6 depicts an example of a differing distribution. Like FIG. 4, FIG. 6 depicts sensor array 32 from a side view in which light 46 is directed along reflection axis 48 onto sensors A1-A4. In FIG. 6, the x,y axes define the surface of the page while the z axis extends into and out of the page. In this example light 46 is distributed unevenly across sensors A1-A4. The uneven or asymmetric distribution is indicated by spot 49 of light 46 directed onto sensor array 32. Here, the intensity of light 46 on sensor A3 is greater than the intensity of light directed onto sensors A1, A2, and A3. The intensities of light on sensors A2 and A4 are greater than the intensity of light 56 on sensor A1.

Comparing FIGS. 4 and 6, assume sensor A1 is a filtered photodiode configured for use in detecting a particular color of light. Assuming that a sample of that color is formed on a print medium, light 46 in FIG. 4 is directed onto that sensor A1 in a manner allowing sensor A1 to produce an output indicative of that color. The output of sensor A1 in the example of FIG. 5 would differ causing the identified color to differ from that which was actually formed on the print medium.

Figure 7:
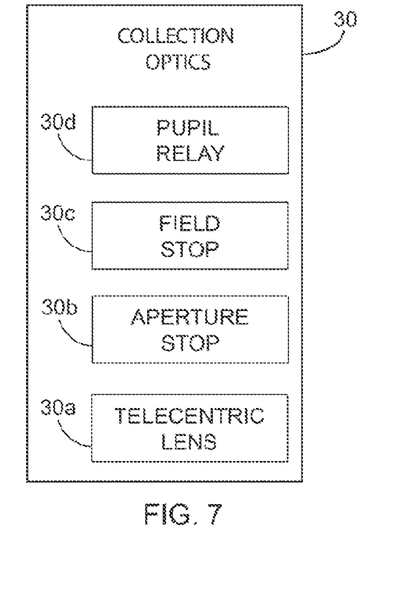
FIG. 7 is an exemplary block diagram depicting collection optics according to an embodiment.

Collection Optics:

FIG. 7 is an exemplary block diagram depicting the components of collection optics 30. In this example, collection optics 30 is shown to include telecentric lens 30a, aperture stop 30b, field stop 30c, and pupil relay 30d. Telecentric lens 30a represents an object side telecentric lens having an entrance pupil at infinity. Aperture stop 30b represents a first aperture positioned between telecentric lens 30a and field stop 30c such that the aperture is positioned at or near the focal point of telecentric lens 30a. Aperture stop 30b limits the on-axis bundle of light 46 (FIG. 3) passing through collection optics 30.

Telecentric lens 30a focuses light through aperture stop 30b toward field stop 30c forming an image of sample 38 (FIG. 3). Field stop 30c represents a second aperture that limits the area of an object plane represented by sample 38 that will be passed through to the desired surface area of sensor array 32. Pupil relay 30d represents a lens configured to image the plane of aperture stop 30b to sensor array 32.

Figure 8:
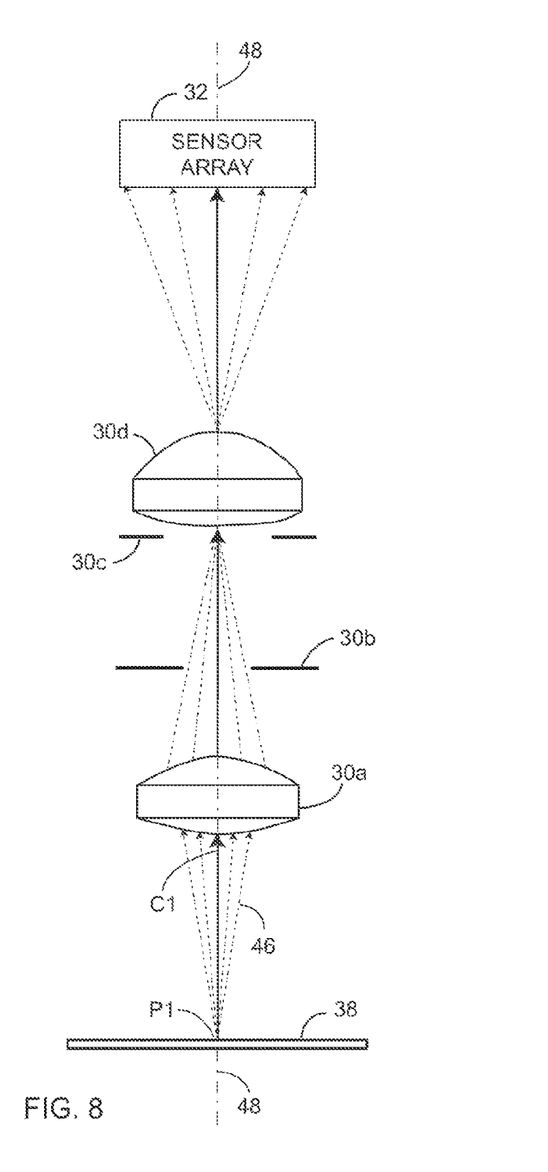
FIGS. 8-10 are is schematic side views of the collection optics according to an embodiment.
Figure 9:
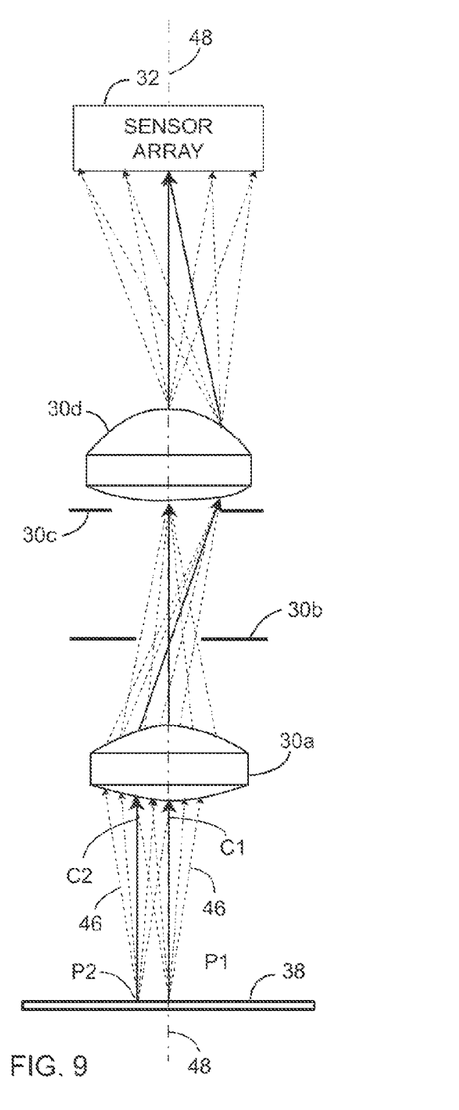
Figure 10:
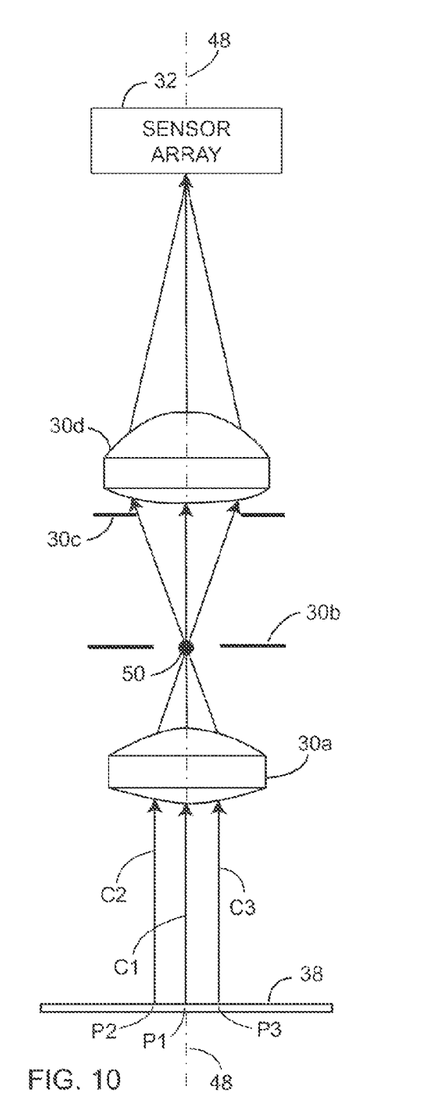

FIGS. 8-10 are exemplary schema side views of collection optics 30 collecting light 46 from an object plane represented by sample 38 onto a detector plane represented by sensor array 32. Starting with FIG. 8, light bundle 46 is shown spreading out from a single point P1 on the object plane 38 to telecentric lens 30a. Light bundle 46 exits telecentric lens 30a passing through aperture stop 30b focusing on field stop 30c. Aperture stop 30b in one embodiment is a planar structure with a hole in it. Aperture stop 30b may be thought of as a plane or location on which any object field point will spread light over and mix with all other object field points emanating from the object plane and collected by telecentric lens 30a. While light bundle 46 is shown spreading out from only one point P1, all points on the object plane will have a corresponding light bundle spreading out from it.

Field stop 30c, as noted above, represents a second aperture that limits the area of object plane that will be passed through to the detector plane represented by sensor array 32. For improved accuracy, field stop 30c may be used to stop all light that is not in the imaging area of sample 38, thus increasing accuracy of the color measurement. In one example, field stop 30c is a planar structure with a hole in it. In another embodiment, the outside diameter edges of pupil relay 30d may function as field stop 30c. Pupil relay 30d relays light bundles 46 onto the detector plane represented by sensor array 32.

As noted, light bundle 46 is shown emanating from point P1 on the object plane represented by sample 38. Light bundle 46 is shown to include center ray C1. Because lens 30a is telecentric, center ray C1 is parallel to collection axis 48. Telecentric lens 30a passes center ray C1 through its focal point at the center of aperture stop 30b and onto field stop 30c. Pupil relay 30d maps light bundle 46 with center ray C1 onto sensor array 32.

FIG. 9 depicts light bundles 46 emanating from points P1 and P2 on the object plane represented by sample 38. Light bundles 46 are shown to include center rays C1 and C2. Because lens 30a is telecentric, center rays C1 and C2 are parallel to collection axis 48. Telecentric lens 30a passes center rays C1 and C2 through its focal point at the center of aperture stop 30b and onto field stop 30c. Pupil relay 30d maps light bundles 46 together onto sensor array 32.

As noted, while FIGS. 8 and 9 show light bundles 46 spreading out from points P1 and P2 respectively, every point on the object plane will have a corresponding light bundle spreading out from it. FIG. 10 depicts three center rays C1, C2, and C3 emanating from points P1, P2, and P3 on the object plane represented by sample 38. Because lens 30a is telecentric, center rays C1, C2, and C3 emanate from the object plane parallel to collection axis 48. Telecentric lens 30a passes center rays C1, C2, and C3 through its focal point 50 at the center of aperture stop 30b and onto field stop 30c. Pupil relay 30c maps center rays C1, C2, and C3 together onto sensor array 32.

Due to the telecentric nature of lens 30a, light scattered about each center ray C1, C2, and C3 will be of the same angular range from points P1, P2, and P3 on the object plane represented by sample 38. This assumes lithe or no vignetting in lens 30a. Further, because center rays pass through focal point 50 as the center of aperture stop 30b, each center ray C1, C2, and C3 has a symmetrical distribution of rays from every field point P1, P2, and P3 that pass through aperture stop 30b. Thus, when the object plane is unexpectedly displaced (moved closer to or further away from collection optics 30), light 46 relayed onto the detector plane represented by sensor array 32 will stay in the same location. If pupil relay 20d is configured as to riot image the exact aperture stop plane, then the light relayed onto the detector plane will just alter slightly in size as result of the displacement. All the field points will change in a similar way, so the color measured will be relatively constant. Lens aberration can also impact this mapping.

The configuration of collection optics 30 shown in FIGS. 7-10 also improves media type sensitivity. As previously noted, samples may be formed on two different types of print media having differing scattering profiles. For example, one sample may be formed on glossy paper while the second is formed on paper having a matte finish. The differing scattering profiles, absent correction, may cause the two samples to be identified being of different colors. The media scatter profile of a surface describes the functional form of the scatter as a function of the angle of incidence of the light striking the surface as well as light angle exiting from the surface. For some print media the scatter intensity will not change appreciably as a function of angle of incidence or exitance while for others it will. When light scatters from a print medium each field point on the media will have a different distribution of angles of the light onto it. But due to the telecentric nature of lens 30a, the light scattered will be the same angular range from all points on the print medium (assuming no vignetting).

Figure 11:
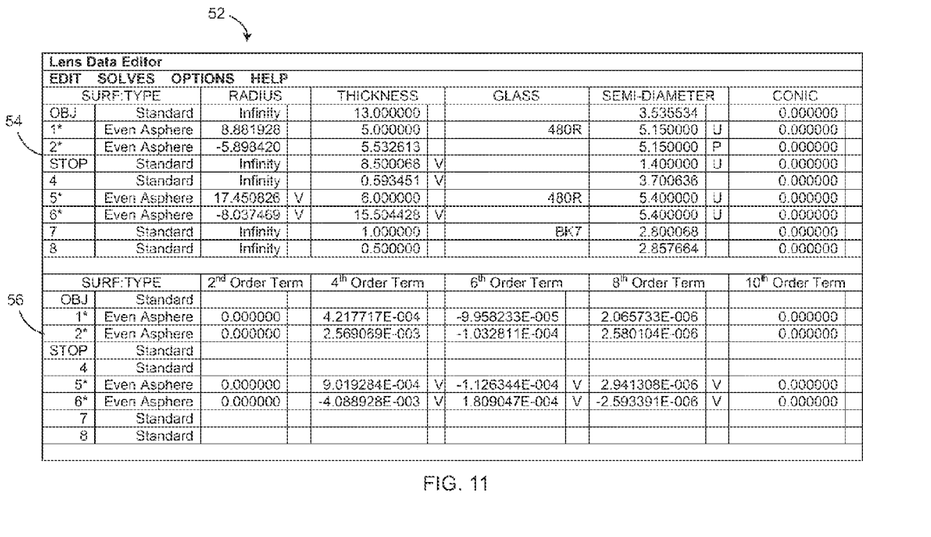
FIG. 11 is table listing parameters for the collection optics according to an embodiment.

FIG. 11 depicts table 52 illustrating specifications for the optical surfaces of collection optics 30 according to one embodiment. While one such specification is shown, many other combinations of optical surfaces with different specifications may be used to produce the desired improved media type and position insensitivity described herein. Table 52 is reproduced from a common lens data editing application, wherein a first column identifies an optical surface, and a second column identifies an optical surface type for that row.

In a top table portion 54, a radius, thickness, glass, semi-diameter and conical value are provided for each lens. The rows in top portion 54 describe optical elements of collection optics 30. Thus, the object plane OBJ represented by sample 38 has an infinite radius. A thickness column indicates a distance to the next optical element, the telocentric lens 30a which is described in the second and third rows labeled 1* and 2*. The row labeled 1* represents a first surface of lens 30a, having a distance specified to a second surface of lens 30a defined in the row labeled 2*. The row labeled STOP represents aperture stop 30b, while the row labeled 4 represents field stop 30c. Rows labeled 5* and 6* represent first and second surfaces of pupil relay 30d. Row 7 corresponds to a cover plate of sensor array 32, and row 8 defines an air space between the cover plate and the detector plane. A positive radius of curvature in the column headed with "Radius" indicates a curve toward the top of FIGS. 5-7, while a negative number indicates a curve extending toward the bottom of FIGS. 5-7.

In a bottom table portion 220, the lens types and conical information is repeated for each optical element, and various order terms for the curvature are specified, such as second order term, fourth order term, sixth order term and eighth order term in one embodiment. These terms describe variations from a spherical surface for each lens, and provide a recipe to one of skilled in the art regarding how to construct each lens.

Figure 12:
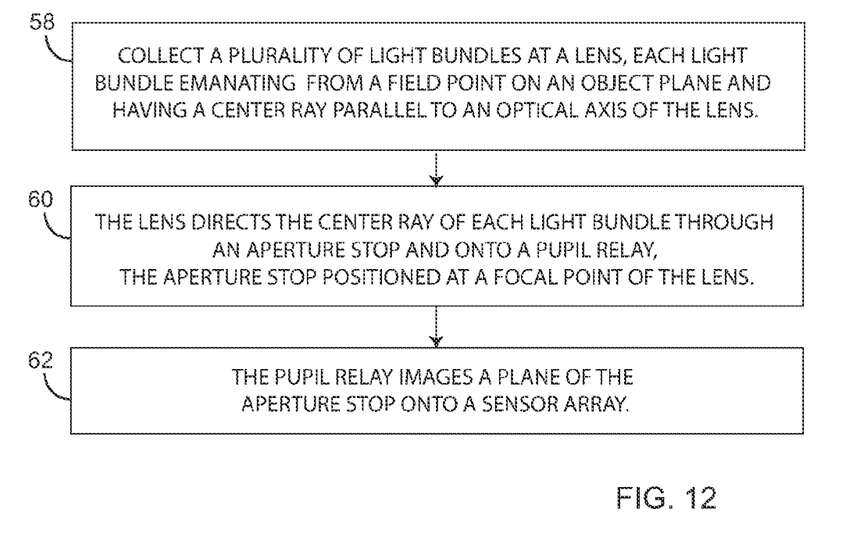
FIG. 12 is a flow diagram depicting a method implementation according to an embodiment.

Operation:

FIG. 12 is an exemplary flow diagram depicting steps taken to implement an embodiment, In discussing FIG. 9, reference is made to the diagrams of FIGS. 3-10. These references are made to provide contextual examples. Implementation, however, is not limited to those examples. A plurality of light bundles is collected at a lens (step 58). Each of the light bundles emanates from a field point on an object plane. Each light bundle includes a center ray that is parallel to the optical axis of the lens. Referring to FIGS. 7-10, the lens of step 58 may be telecentric lens 30a. Due to its telecentric nature, center rays C1, C2, and C3 are all parallel to collection axis 48.

The lens directs the center ray of each of the light bundles through an aperture stop and onto a pupil relay (step 60). The aperture stop is positioned at or near the focal point of the lens of step 58. Referring again back to FIGS. 7-10, telecentric lens directs light bundles 46 through aperture stop 30b and onto pupil relay 30d. As shown in FIG. 10, focal point 50 of telecentric lens 30a is centered on aperture stop 30b. Thus all light bundles 46 directed by telecentric lens 30a onto pupil relay 30d overlap one another at a plane defined by aperture stop 30b. Further, because lens 30a is telecentric, light bundles 46 are distributed symmetrically from every field point that passes through aperture stop 30b.

The pupil relay images the plane of the aperture stop onto a sensor array (step 62). Referring to FIGS. 7-10, the plane of the aperture is a location where all of the light bundles 46 scattered from sample 36 are overlapped. Thus, pupil relay 20d is able to relay a homogenized blend of light bundles 46 to sensor array 20d.

Collecting in step 58 can include collecting a first plurality of light bundles and then a second plurality of light bundles. The first plurality of light bundles emanate from a first sample formed on a first print medium of a first type. The second plurality of light bundles emanate from a sample formed on a second print medium of a second type different than the first type. The first and second samples are of substantially the same color. However, the light bundles emanating from the first sample have a first scattering profile, and the light bundles reflected from the second sample have a second scattering profile different than the first scattering profile. A first output of the sensor array corresponding to the first plurality of light bundles is analyzed to identify a first color. A second output of the sensor array corresponding to the second plurality of light bundles is analyzed to identify a second color. Despite the differing scattering patterns of the two print media types, the identified second color is substantially identical to the identified first color. The result is due at least in part to the ability telecentric lens 30a to symmetrically gather scattered light bundles and also overlap, at the plane of the aperture stop, each of the light bundles directed onto the pupil relay, and the ability of the pupil relay to relay a homogenized blend of the light bundles to the sensor array.

Collecting in step 58 can include collecting a first plurality of light bundles and then a second plurality of light bundles. The first plurality of light bundles emanate from a first sample formed on a first print medium. The first sample is positioned, along collection axis 48, a first distance from collection optics 30. The second plurality of light bundles emanate from a second sample formed on a second print medium. The second sample is positioned, along collection axis 48, a second distance from collection optics 30. That second distance is less than the first distance, and the first and second samples are of substantially the same color. A first output of the sensor array corresponding to the first plurality of light bundles is analyzed to identify a first color. A second output of the sensor array corresponding to the second plurality of light bundles is analyzed to identify a second color. Despite the differing positions of the two samples, the identified second color is substantially identical to the identified first color. The result is due at least in part to the ability telecentric lens 30a to consistently collect the same angular spread of the scattered light bundles from each object field point of the media at different media positions while symmetrically overlapping, at the plane of the aperture stop, each of the light bundles directed onto the pupil relay, and the ability of the pupil relay to relay a homogenized blend of the light bundles to the sensor array.

CONCLUSION

The printing system 12 shown in FIGS. 1 and 2 is an exemplary device in which embodiments of the present invention may be implemented. Implementation, however, is not so limited. Embodiments can be implemented in any environment in which it is desirable to identify a color of a sample. The diagrams of FIGS. 2-11 show the architecture, functionality, and operation of various embodiments. The block controller 24 in FIG. 2 is defined in part as a program. Controller 24 may represent, at least in part, a module, segment, or portion of code that comprises one or more executable instructions to implement the specified logical function(s). Controller 26 may also represent a circuit or a number of interconnected circuits to implement the specified logical function(s).

Although the flow diagram of FIG. 12 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method, comprising:
    collecting a plurality of light bundles at a lens, each light bundle emanating from a different field point of an object plane and having a center ray at least substantially parallel to an optical axis of the lens;
    the lens directing the plurality of bundles of light such that the center ray of each of the plurality of light bundles is directed through an aperture stop and onto a pupil relay, the aperture stop positioned at or near a focal point of the lens and such that the directed plurality of light bundles overlap at a plane of the aperture stop;
    the pupil relay imaging the plane of the aperture stop onto a sensor array,
    wherein collecting comprises collecting, at the lens, a first plurality of light bundles emanating from a first sample positioned a first distance from the lens and then collecting, at the lens, a second plurality of light bundles emanating from a second sample positioned a second distance from the lens, the method further comprising:
    analyzing a first output of the sensor array corresponding to the first plurality of light bundles to identify a first color; and
    analyzing a second output of the sensor array corresponding to the second plurality of light bundles to identify a second color, the identified second color being substantially identical to the identified first color;
    wherein the second distance is less than the first distance and the first and second samples are of substantially the same color.

2. The method of claim 1, wherein the lens is a telecentric lens.

3. The method of claim 1, wherein the pupil relay imaging a plane of the aperture stop comprises the pupil relay relaying a homogeneous blend of the light bundles to the sensor array.

4. The method of claim 1, wherein collecting comprises collecting, at the lens, the first plurality of light bundles emanating from the first sample formed on a first print medium of a first type and then collecting, at the lens, the second plurality of light bundles emanating from the second sample formed on a second print medium of a second type that is different than the first type,
    wherein the first plurality of light bundles has a first scattering profile and the second plurality of light bundles has a second scattering profile different than the first scattering profile.

5. An optical system, comprising a lens, a pupil relay, and an aperture stop positioned at or near a focal point of the lens between the lens and the pupil relay, wherein:
    the lens is configured to collect a plurality of light bundles, each of the plurality of light bundles emanating from a different field point of an object plane and having a center ray at least substantially parallel to an optical axis of the lens;
    the lens is configured to direct the plurality of light bundles such that the center ray of each of the plurality of light bundles is directed through the aperture stop and onto the pupil relay and that the directed plurality of light bundles overlap at a plane of the aperture stop; and
    the pupil relay is configured to image the plane of the aperture stop onto a sensor array;
    the optical system further comprising a controller operable to analyze output of the sensor array, wherein:
    the lens is configured to collect a first plurality of light bundles emanating from a first sample formed on a first print medium of a first type and then collect a second plurality of light bundles emanating from a second sample formed on a second print medium of a second type that is different than the first type; and
    the controller is configured to analyze a first output of the sensor array corresponding to the first plurality of light bundles to identify a first color and analyze a second output of the sensor array corresponding to the second plurality of light bundles to identify a second color, the identified second color being substantially identical to the identified first color;
    the first and second samples are of substantially the same color, the first plurality of light bundles has a first scattering profile and the second plurality of light bundles has a second scattering profile different than the first scattering profile.

6. The optical system of claim 5, further comprising a field stop positioned between the aperture stop and the pupil relay, the field stop configured to limit the area of the object plane that is imaged onto the sensor array.

7. The optical system of claim 5, wherein the lens is a telecentric lens.

8. The optical system of claim 5, wherein the pupil relay is configured to relay a homogenized blend of the light bundles to the sensor array.

9. An optical system, comprising a lens, a pupil relay, and an aperture stop positioned at or near a focal point of the lens between the lens and the pupil relay, wherein:
the lens is configured to collect a plurality of light bundles, each of the plurality of light bundles emanating from a different field point of an object plane and having a center ray at least substantially parallel to an optical axis of the lens;
the lens is configured to direct the plurality of light bundles such that the center ray of each of the plurality of light bundles is directed through the aperture stop and onto the pupil relay and that the directed plurality of light bundles overlap at a plane of the aperture stop; and
the pupil relay is configured to image the plane of the aperture stop onto a sensor array;
the optical system further comprising a controller operable to analyze output of the sensor array, wherein:
the lens is configured to collect a first plurality of light bundles emanating from a first sample positioned a first distance from the lens and then collect a second plurality of light bundles emanating from a second sample positioned a second distance from the lens; and
the controller is configured to analyze a first output of the sensor array corresponding to the first plurality of light bundles to identify a first color, and to analyze a second output of the sensor array corresponding to the second plurality of light bundles to identify a second color, the identified second color being substantially identical to the identified first color;
the second distance is less than the first distance and the first and second samples are of substantially the same color.

10. The optical system of claim 9, further comprising a field stop positioned between the aperture stop and the pupil relay, the field stop configured to limit the area of the object plane that is imaged onto the sensor array.

11. The optical system of claim 9, wherein the lens is a telecentric lens.

12. The optical system of claim 9, wherein the pupil relay is configured to relay a homogenized blend of the light bundles to the sensor array.

* * * * *